(12) United States Patent
Ethier et al.

(10) Patent No.: US 7,778,393 B2
(45) Date of Patent: *Aug. 17, 2010

(54) SYSTEM AND METHOD FOR END-TO-END COMMUNICATIONS TRACING

(75) Inventors: Randall P. J. Ethier, Herndon, VA (US); Michael P. Hammer, Reston, VA (US); Scott S. Firestone, Mountain View, CA (US)

(73) Assignee: Cisco Technlogy, Inc., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/736,130

(22) Filed: Apr. 17, 2007

(65) Prior Publication Data

US 2007/0201620 A1 Aug. 30, 2007

Related U.S. Application Data

(63) Continuation of application No. 10/888,158, filed on Jul. 9, 2004, now Pat. No. 7,206,385, which is a continuation of application No. 10/868,982, filed on Jun. 15, 2004, now Pat. No. 7,283,619.

(51) Int. Cl.
*H04M 15/00* (2006.01)
(52) U.S. Cl. ............ 379/32.05; 379/32.01; 379/112.06; 379/133
(58) Field of Classification Search ... 379/32.01–32.05, 379/112.06–112.08, 114.001, 126, 133, 134, 379/135, 137–140, 207.02, 207.04, 229
See application file for complete search history.

(56) References Cited

U.S. PATENT DOCUMENTS

| | | | |
|---|---|---|---|
| 4,959,849 A | 9/1990 | Bhusri | 379/32 |
| 5,659,604 A | 8/1997 | Beckmann | 379/220 |
| 5,809,121 A | 9/1998 | Elliott et al. | 379/127 |
| 5,930,344 A * | 7/1999 | Relyea et al. | 379/126 |
| 6,295,353 B1 | 9/2001 | Flockhart et al. | 379/265 |
| 6,320,955 B1 | 11/2001 | Bushnell | 379/246 |
| 6,345,087 B1 | 2/2002 | Batham | 379/32.05 |
| 6,359,976 B1 | 3/2002 | Kalyanpur et al. | 379/134 |
| 6,373,932 B2 | 4/2002 | Bakshi et al. | 379/126 |
| 6,456,845 B1 | 9/2002 | Drum et al. | 455/424 |

(Continued)

FOREIGN PATENT DOCUMENTS

WO  WO 99/29090  6/1999

OTHER PUBLICATIONS

U.S. Appl. No. 10/269,895, entitled "System and Method for Distributed Diagnostics in a Communication System," filed Oct. 10, 2002, 44 pages.

(Continued)

*Primary Examiner*—Quoc D Tran
(74) *Attorney, Agent, or Firm*—Baker Botts L.L.P.

(57) ABSTRACT

A method for tracing communications includes receiving trace criteria from a first remote element and determining whether a call signaling message matches the trace criteria. The method includes attaching a trace tag to the call signaling message, if the call signaling message matches the trace criteria. The method further includes transmitting the call signaling message to a second remote element.

41 Claims, 4 Drawing Sheets

U.S. PATENT DOCUMENTS

| | | | | |
|---|---|---|---|---|
| 6,654,602 | B1 | 11/2003 | Fye et al. | 455/414 |
| 6,697,468 | B2 | 2/2004 | Wong et al. | 379/112.01 |
| 7,042,881 | B1 | 5/2006 | Dhar et al. | 370/395.2 |
| 7,050,549 | B2 | 5/2006 | Hannigan | 379/32.02 |
| 7,206,385 | B2 * | 4/2007 | Ethier et al. | 379/32.05 |
| 7,209,548 | B2 * | 4/2007 | Ethier et al. | 379/32.05 |
| 7,283,619 | B2 * | 10/2007 | Ethier et al. | 379/32.05 |
| 2002/0071530 | A1 | 6/2002 | Hannigan | 379/88.19 |
| 2003/0142803 | A1 | 7/2003 | Freedman et al. | 379/114.14 |
| 2004/0073658 | A1 | 4/2004 | Oran et al. | 709/224 |
| 2005/0276385 | A1 * | 12/2005 | McCormick et al. | 379/1.02 |

OTHER PUBLICATIONS

U.S. Appl. No. 10/766,245, entitled "System and Method for Distributed IP Telephony Tracking," filed Jan. 26, 2004, 50 pages.

"3rd Generation Partnership Project; Technical Specification Group Services and System Aspects; Subscriber and Equipment Trace (Release 5)," 3GPP TS 32.108 V0.0.1, *European Telecommunications Standards Institute*, Oct. 2001, 44 pages.

"Universal Mobile Telecommunications System (UMTS); Telecommunication management; Subscriber and equipment trace; Trace concepts and requirements (3GPP TS 32.421 version 6.7.0 Release 6)," ETSI TS 132 421, *European Telecommunications Standards Institute*, Jun. 2005, 23 pages.

Universal Mobile Telecommunications System (UMTS); Telecommunication management; Subscriber and equipment trace; Trace control and configuration management (3GPP TS 32.422 version 6.3.0 Release 6), ETSI TS 132 422, *European Telecommunications Standards Institute*, Jun. 2005, 42 pages.

"Universal Mobile Telecommunications System (UMTS); Telecommunication management; Subscriber and equipment trace; Trace data definition and management (3GPP TS 32.423 version 6.2.0 Release 6)," ETSI TS 132 423 V6.2.0, *European Telecommunications Standards Institute*, Jun. 2005, 38 pages.

"Digital cellular telecommunications system (Phase 2+); Telecommunication management; GSM subscriber and equipment trace (3GPP TS 52.008 version 6.0.0 Release 6)," ETSI TS 152 008 V6.0.0, *European Telecommunications Standards Institute*, Dec. 2004, 58 pages.

U.S. Appl. No. 11/736,157, entitled, "System and Method for End-to-End Communications Tracing," filed Apr. 17, 2007, 71 pages.

European Patent Office Communication with attached Supplementary European Search Report in Application No. 05758461.7-2414, dated Aug. 17, 2009, 5 pages.

European Patent Office Communication with attached European Search Report in Application No. 07004320.3-2414, dated Aug. 18, 2009, 9 pages.

"3rd Generation Partnership Project; Technical Specification Group Services and System Aspects; Telecommunication management; Subscriber and equipment trace: Trace concepts and requirements (Release 6)," 3GPP TS 32.421 V6.3.0 (Mar. 2004), XP-002423987, *3GPP Organization Partners*, Mar. 2004, 22 pages.

* cited by examiner

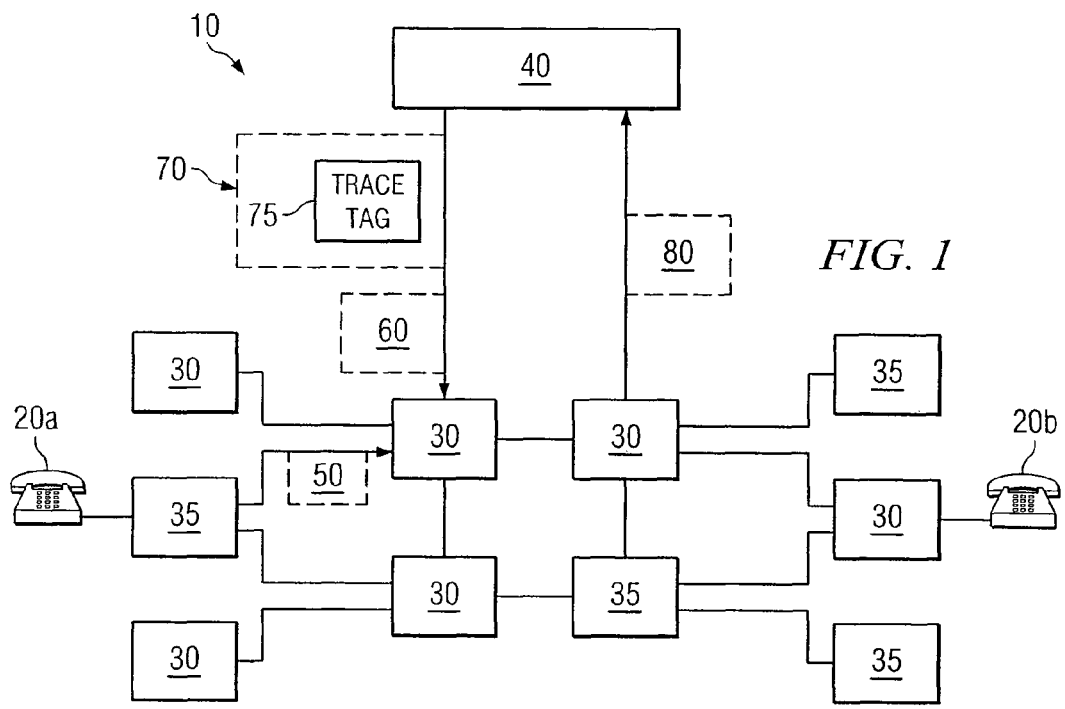
FIG. 1
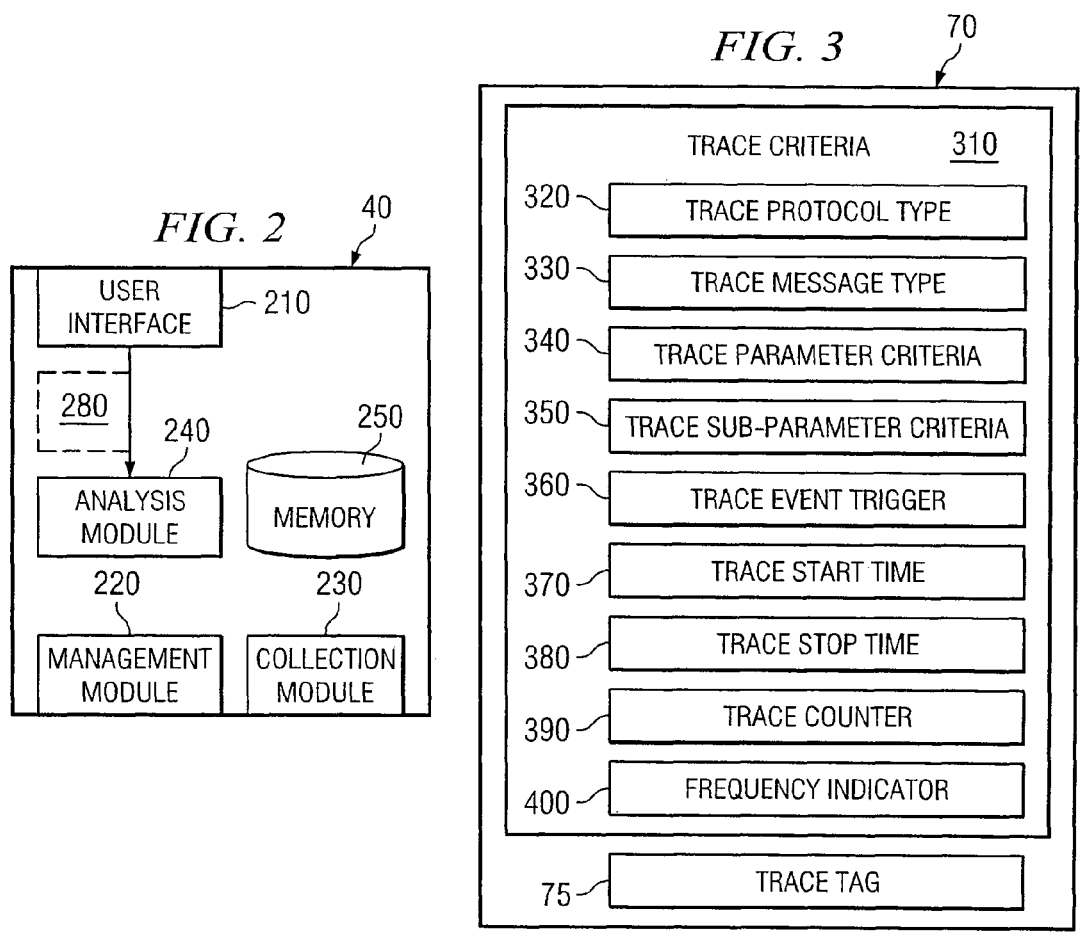
FIG. 2
FIG. 3

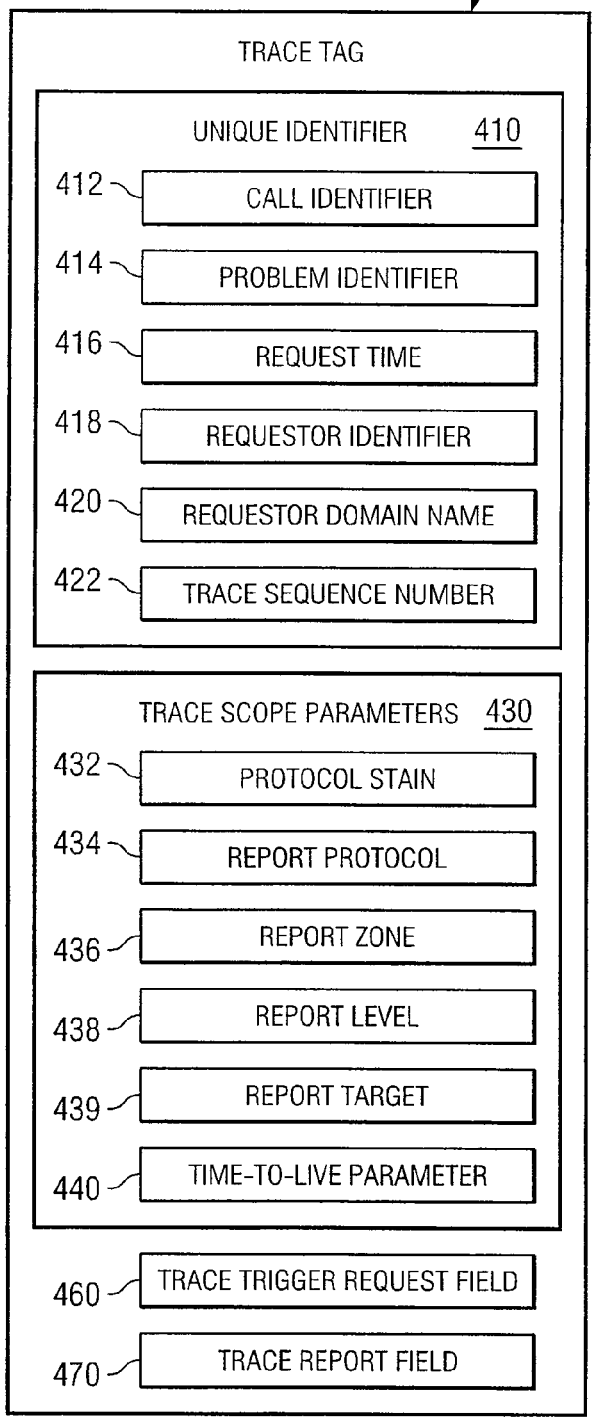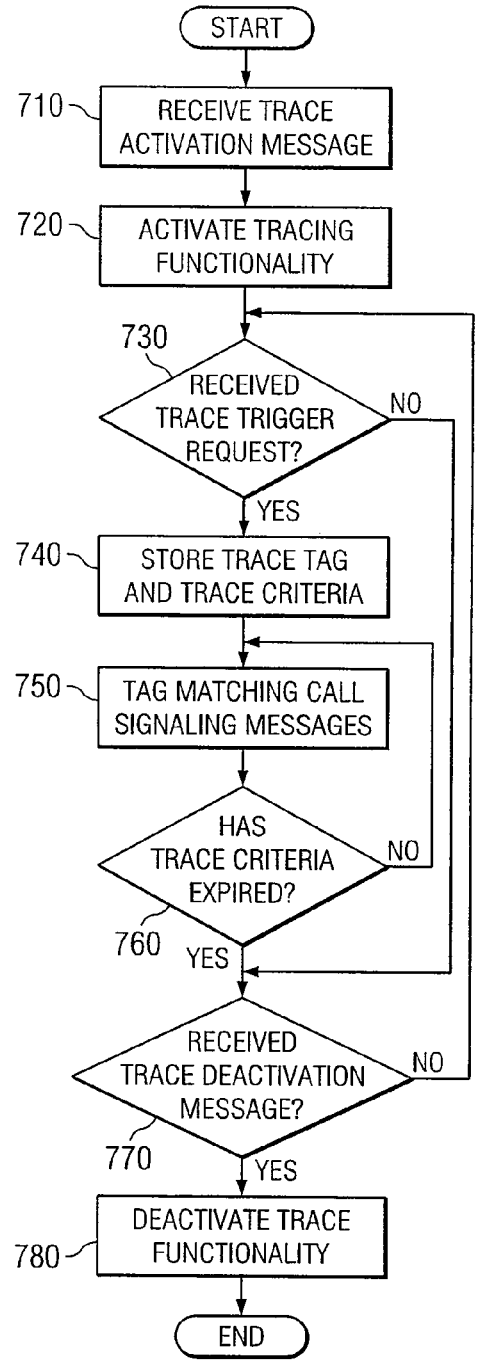

SYSTEM AND METHOD FOR END-TO-END COMMUNICATIONS TRACING

CROSS-REFERENCE TO RELATED APPLICATIONS

This application is a continuation of U.S. application Ser. No. 10/888,158 filed Jul. 9, 2004 and entitled "System and Method for End-To-End Communications Tracing" which is a continuation of U.S. patent application Ser. No. 10/868,982 filed Jun. 15, 2004, entitled "System and Method for End-to-End Communications Tracing."

TECHNICAL FIELD OF THE INVENTION

This invention relates in general to telecommunications and, more particularly, to a system and method for diagnostic call tracing.

BACKGROUND OF THE INVENTION

Modern communication networks often employ highly distributed control functions that utilize a variety of signaling protocols. Diverse, distributed networks may allow for greater scalability and flexibility in providing communication services. Protocol diversity and decentralized signaling architectures, however, complicate troubleshooting of configuration errors, software bugs, and hardware faults. Call logging and other forms of reporting may be used to identify and locate problems within a network Within a particular network, however, multiple problems may exist concurrently. Furthermore, the integration of various administrative domains within the network, such as intra-enterprise, inter-enterprise, and service provider domains, with differing troubleshooting requirements, may create difficulties in implementing a single, uniform procedure for call reporting. Additionally, unnecessary call tracing and reporting may impair debugging by obscuring useful information and may degrade call processing by utilizing valuable network resources.

SUMMARY OF THE INVENTION

In accordance with the present invention, the disadvantages and problems associated with telephony filtering have been substantially reduced or eliminated. In particular, a method and system are provided for communicating a tracing status of a call to a plurality of nodes and of collecting tracing information from the nodes.

In accordance with one embodiment of the present invention, a method for tracing communications includes receiving trace criteria from a first remote element and determining whether a call signaling message matches the trace criteria. The method includes attaching a trace tag to the call signaling message, if the call signaling message matches the trace criteria. The method further includes transmitting the call signaling message to a second remote element.

In accordance with another embodiment of the present invention, a method for tracing communications includes receiving a call signaling message and determining whether the call signaling message includes a trace tag. The method further includes transmitting a trace report to a remote element, if the call signaling message includes a trace tag.

Technical advantages of certain embodiments of the present invention include an improved method of communicating requests for tracing services and propagating tracing services reports in a distributed, multi-protocol network. Other technical advantages of certain embodiments of the present invention include the ability to correlate captured information on a per call basis to facilitate analysis, to tailor filtering criteria to limit unnecessary reporting, and to optimize the type of information that is reported for filtered calls.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a communication system according to a particular embodiment;

FIG. 2 is a block diagram showing contents of a management node according to a particular embodiment;

FIG. 3 illustrates contents of a trace trigger request according to a particular embodiment;

FIG. 4 illustrates contents of a trace tag according to a particular embodiment;

FIG. 7 is a flowchart illustrating operation a particular embodiment of the tracing node.

DETAILED DESCRIPTION OF THE INVENTION

Figure 5:
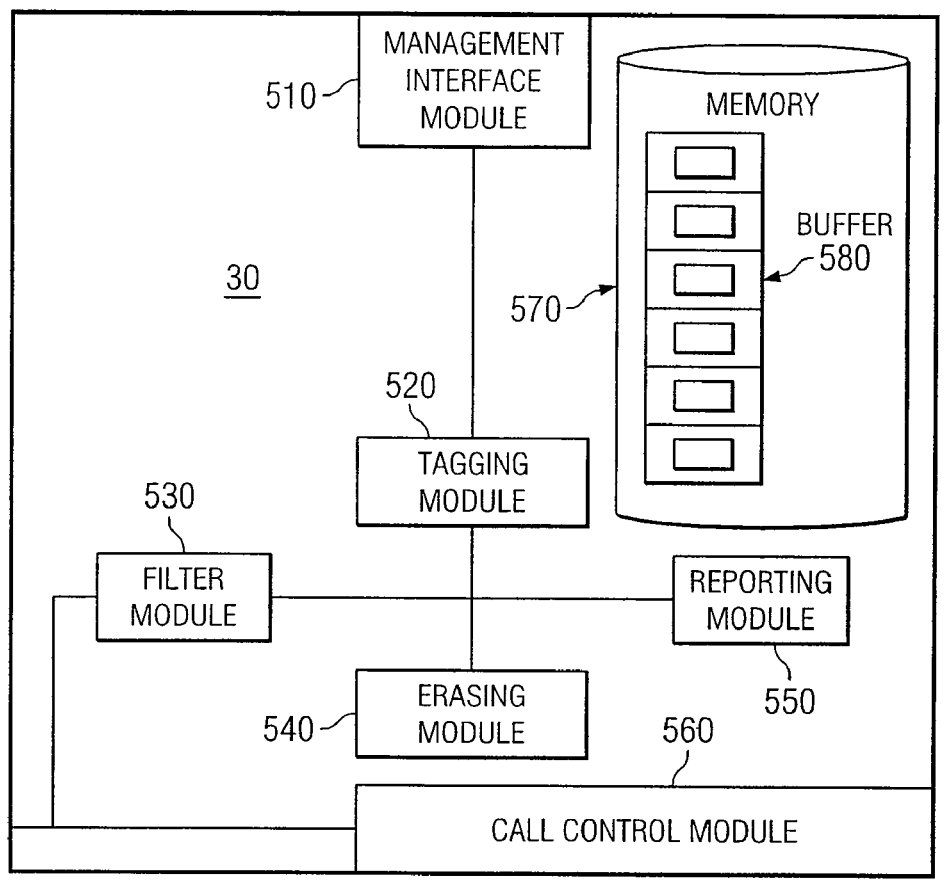
FIG. 5 is a block diagram showing contents of a tracing node according to a particular embodiment.

FIG. 1 illustrates a communication system 10, according to a particular embodiment. Communication system 10 includes endpoints 20, tracing nodes 30, nodes 35, and a management node 40. Tracing nodes 30 and nodes 35 support communication between endpoints 20 by transmitting call signaling messages 50 along a path between endpoints 20. Tracing nodes 30 and nodes 35 may convey call signaling message 50 on one of multiple protocol paths connecting any two nodes. During operation, management node 40 may request the tracing of calls matching specified criteria. Management node 40 specifies the trace criteria in trace trigger requests sent by the management node 40 to one or more tracing nodes 30. Tracing nodes 30 compare the contents of call signaling message 50 to specified trace criteria included in trace trigger request 70. When the trace criteria matches, the relevant tracing node 30 transmits a trace tag 75 embedded in trace trigger request 70 to other tracing nodes 30. Other tracing nodes 30 may then provide tracing information to a designated management node 40 upon receiving a call signaling message 50 that includes the transmitted trace tag 70. Tracing nodes 30, upon receipt of trace tag 75, may report to a designated reporting address, such as a particular management node 50 specified by trace tag 75, diagnostic information specified by trace trigger request 70, such as signaling protocol messages of a particular type or types or diagnostic trace information for a specified level of detail, in a trace report 80.

By providing an effective process for propagating trace tag 70 along a path associated with call signaling message 50, communication system 10 may enable end-to-end session tracing in a highly distributed, multi-protocol environment. In particular embodiments, communication system 10 may provide detailed control of tracing and reporting performed by tracing nodes 30 and, as a result, may limit performance degradation and network load resulting from the tracing and reporting. Additionally, by facilitating the tunneling of trace trigger requests 70 and trace reports 80 within control signal messages 50, particular embodiments of communication system 10 may provide a method for tracing and reporting that can operate despite the presence of nodes 35 that do not support the described trace request messages or trace reporting functionality.

Endpoints 20 may be any combination of hardware, software, and/or encoded logic that provides communication services to a user. For example, endpoints 20 may include a telephone, a computer running telephony software, a video monitor, a camera, or any other communication hardware, software, and/or encoded logic that supports the communication of packets of media (or frames) using communication system 10. In a particular embodiment, endpoints 20 represent Internet Protocol (IP) telephones. Endpoints 20 may also include unattended or automated systems, gateways, other intermediate components, or other devices that can establish media sessions. Although FIG. 1 illustrates a particular number and configuration of endpoints 20, communication system 10 contemplates any number or arrangement of such components to support communications of media.

Tracing nodes 30 and nodes 35 couple to other tracing nodes 30 and/or nodes 35 and are capable of creating transmission paths to route calls between endpoints 20. More specifically, tracing nodes 30 and nodes 35 may be capable of receiving call signaling messages 50 and performing call setup and other call control functions based on call signaling message 50. Tracing nodes 30 are additionally capable of tracing call signaling messages 50 associated with calls transmitted on communication system 10, propagating trace tags 70 received from management node 40 or extracted from trace trigger requests 70 to other tracing nodes 30, and reporting information related to these calls to management node 40.

Nodes 35 may lack the capability to respond to tracing requests, to modify call signaling messages 50, and/or to perform reporting. Although, for the purposes of illustrating particular capabilities of tracing nodes 30 operating in mixed systems, FIG. 1 illustrates an embodiment of communication system 10 that includes nodes 35 incapable of providing the described tracing and reporting functionality, a particular embodiment of communication system 10 may include none, one or multiple nodes 35. Alternatively, any or all telephony nodes in a particular embodiment of communication system 10 may represent tracing nodes 30.

Management node 40 facilitates interaction between an administrator or a management device and tracing nodes 30. Management node 40 generates trace trigger requests, based on input from a user or other management device, and provides tracing information to the user or management device, based on tracing reports collected from tracing nodes 30. If communication system 10 is configured to respond to requests from a human administrator or other user, management node 40 may include user interface components, such as a keyboard, mouse, and/or monitor, to facilitate interaction between the user and management node 40.

In general, tracing nodes 30, nodes 35, and management node 40 may include any combination of network components, gatekeepers, media gateway controllers, softswitches, IP PBXs, call managers, SIP proxy servers, routers, bridges, hubs, switches, gateways, endpoints, telephony interfaces, IP interfaces, digital signal processors, protocols, voice routing modules, or call control modules, and/or any other suitable hardware, software, or embedded logic implementing any number of communication protocols that allow for the exchange of data in communication system 10. Although this description focuses, for the purpose of illustration, on particular embodiments of communication system 10 that propagate trace tag 75 on the call control layer, alternative embodiments of communication system 10 may propagate trace tag 75 on the bearer control layer, the application layer, device control layer, and/or the media inside bearer layer.

In a particular embodiment, tracing nodes 30, nodes 35, and management node 40 may represent Voice over IP ("VoIP") components. As noted above, management node 40 may include user interface components, such as a keyboard, mouse, and/or monitor to allow a user to interact with management node 40. Additionally, in a particular embodiment, management node 40 may represent non-telephony components, such as servers, networked personal computers (PCs), or any other suitable computing device.

In operation, tracing node 30 determines a trace status of a call signaling message 50 passing through trace node 30. Call signaling message 50 may represent any appropriate signaling message associated with a call established or a call to be established on communication system 10. The "call" may represent any suitable communication session, dialog, and/or other suitable form of connection and may include audio and/or video and/or animation and/or holography signals, data, or messages transmitted through voice devices, text chat, web sessions, facsimile, instant messaging, e-mail, or any other type of digital communication. In the illustrated embodiment, the call represents a voice call communicated using Voice over IP (VoIP) protocol.

Call signaling message 50 may represent any suitable form of control message or signal corresponding to a signaling protocol supported by one or more elements of communication system 10 and generated as part of the call. As noted above, call signaling message 50 may represent a signaling message transmitted on the call control layer, the application layer, and/or the bearer layer. For example if call signaling messages 50 represent messages communicated on the call control layer, call signaling message 50 may specifically represent a Session Initiation Protocol (SIP), an H.323, a Media Gateway Control Protocol (MGCP), Skinny Client Control Protocol (SCCP), Signaling Connection Control Part (SCCP), Bearer Independent Call Control (BICC), Narrow-band Signaling Syntax (NSS) format message, or any other suitable form of call control layer message. If call signaling messages 50 represent messages communicated on the application layer, call signaling message 50 may represent a Java Telephony Application Programming Interface (JTAPI), Telephony Application Programming Interface (TAPI), Java APIs for Integrated Networks (JAIN), Parlay, Intelligent Network Application Protocol (INAP), Advanced Intelligent Network (AIN) message, or any other suitable form of application layer message. If call signaling messages 50 represent messages communicated on the bearer layer, call signaling message 50 may represent a Resource Reservation Protocol (RSVP), or Real-time Transport Control Protocol (RTCP) message, or any other suitable form of bearer layer message.

Prior to initiation of the call or at any other appropriate point during operation, management node 40, in a particular embodiment of communication system 10, activates the tracing functionality of communication system 10 by transmitting a trace activation message 60 to one or more tracing nodes 30. Trace activation message 60 may represent any suitable message or signal by which management node 40 may activate tracing functionality in tracing nodes 30. Management node 40 may transmit trace activation message 60 to all tracing nodes 30 in communication system 10, to a single tracing node 30 to be propagated to other tracing nodes 30, or to particular tracing nodes 30 configured to receive trace activation messages 60, depending on the configuration and characteristics of communication system 10. In an alternative embodiment of communication system 10, tracing functionality in tracing nodes 30 are activated by default. In such an embodiment, management node 40 may request tracing without previously activating tracing functionality of tracing nodes 30.

Once tracing functionality has been activated on communication system 10, management node 40 may transmit a trace trigger request 70 to one or more tracing nodes 30. Trace trigger request 70 may represent any suitable message or signal by which management node 40 may indicate to tracing nodes 30 a desire to trace calls matching specified criteria. In a particular embodiment, trace trigger request 70 represents an extensible Markup Language (XML) message. FIG. 3 illustrates in greater detail the contents of trace trigger request 70 according to a particular embodiment.

Trace trigger request 70 may include a trace tag 75 that identifies information to be reported and a destination address for trace reports 80, such as the address for a particular management node 40. Trace tag 75 may represent an XML object or data structured in any other appropriate format compatible with the signaling protocol of call control message 50 housing trace tag 75. Trace tag 75 may also include a recursive reference to trace trigger request 70 for tunneling the trace request through nodes 35. FIG. 4 illustrates in greater detail the contents of trace tag 75 according to a particular embodiment.

Upon receiving trace trigger request 70, a particular tracing node 30 may configure itself to trace calls with call signaling messages 50 matching call trace criteria included in trace trigger request 70 and report any requested signaling and diagnostic information to the specified destination address of the management node 40. Additionally, particular tracing node 30 may configure tracing node 30 to modify signaling messages 50, possibly spanning two or more signaling protocols, to propagate trace tag 75 to other tracing nodes 30. The operation of a particular embodiment of tracing node 30 is described in greater detail with respect to FIG. 5.

As a result, tracing node 30, having received trace tag 75 directly by the initial trace request 70 or by some signaling protocol with other components of communication system 10, may begin logging information requested by trace tag 75 pertaining to the call. At appropriate times, tracing node 30 may generate trace reports 80 that include some or all of the logged information and transmit trace reports 80 to management node 40 designated by trace tag 75. Report 80 may be conveyed on one of multiple protocol paths connecting tracing nodes 30 to management node 40. Tracing node 30 may continue tracing, reporting, and modifying call signaling messages 50 indefinitely. As described below, trace trigger request 70 may additionally include parameters that describe a termination condition for trace trigger request 70 and tracing node 30 may terminate tracing, reporting, and modifying if, and when, the termination condition is satisfied. Furthermore, particular embodiments of communication system 10 may be configured to allow for deactivation of the tracing functionality by transmitting a trace deactivation message (not shown) to one or more tracing nodes 30. The trace deactivation message may represent any suitable message or signal by which management node 40 may deactivate tracing functionality in tracing nodes 30. Management node 40 may transmit the trace deactivation message to all tracing nodes 30 in communication system 10, to a single tracing node 30, or to one or more tracing nodes 30 configured to receive trace deactivation messages, depending on the configuration and characteristics of communication system 10.

Thus, particular embodiments of communication system 10 may provide cost flexible, scalable, and cost effective methods for call tracing. Furthermore, because trace tag 75 can be tunneled as objects or parameters in conventional signaling protocols and because communication system 10 contemplates tunneling of trace trigger requests 70, elements of communication system 10 can be integrated with existing communication systems and operate in conjunction with components that are not configured to provide the described tracing functionality. Additionally, because trace tag 75 includes multiple parameters defining such criteria as starts times, time-to-live values, and branch counters, communication system 10 provides administrators with a very flexible system that can be configured to minimize unnecessary network loads and processing delays and to maximize the effectiveness of information generated during tracing.

FIG. 2 illustrates the contents and operation of a particular embodiment of management node 40 in greater detail. Management node 40 facilitates interaction between an administrator of communication system 10 or a management device and tracing nodes 30. Management node 40 includes a user interface 210, a management module 220, a collection module 230, an analysis module 240, and a memory 250. The administrator or management device requests tracing services through user interface 210 and, in response, management node 40 transmits trace trigger request 70 to one or more tracing nodes 30 through management module 220. Management node 40 subsequently receives trace reports 80 from tracing nodes 30 through collection module 230, analyzes trace reports using analysis module 240, and provides information from tracing reports 80 to the administrator or management device through user interface 210.

User interface 210 facilitates interaction between an administrator or management device of communication system 10. As indicated above, if communication system 10 is configured to operate with a human administrator, user interface 210 may include components to allow the administrator to interact with management node 40, such as a keyboard, mouse, monitor, printer, or any other components appropriate to allow the administrator to input information into management node 40 or receive information from management node 40.

Alternatively, if mobile station 20 is configured to operate with an automated management device, user interface 210 may include components for interacting with the management device such as a network interface, data port, or other appropriate components. In general, user interface 210 receives trace parameters 280 from the administrator or management device and transmits trace parameters 280 to management module 220. Additionally, user interface 210 displays information received in trace reports 80 to the administrator or transmits data from trace reports 80 to the management device.

Management module 220 receives trace parameters 280 from user interface 210 and generates trace trigger request 70 from trace parameters 280. FIG. 3 illustrates in greater detail the contents of trace trigger request 70, according to a particular embodiment. Management module 220 then transmits trace trigger request 70 to one or more tracing nodes 30. Collection module 230 interfaces with tracing nodes 30 and receives trace report 80 from tracing nodes 30. Collection module 230 transmits trace reports 80 to analysis module 240. Analysis module 240 correlates trace reports 80 received from collection module 230 and formats trace reports 80 for presentation to user interface 210.

User interface 210, management module 220, collection module 230, and analysis module 240 may include any appropriate combination of components, including hardware and/or software, suitable for providing the described functionality. Additionally, the functionality described for any one or more of user interface 210, management module 220, collection module 230, and analysis module 240 may be provided by shared or physically integrated components or by the same component or group of components.

In a particular embodiment, management node 40 includes a computing element, such as a microprocessor, and user interface 210, management module 220, collection module 230, and analysis module 240 each represent, in part or in whole, software processes running on the computing element. As a result, in such an embodiment, the computing element may provide some or all of the functionality described for each of user interface 210, management module 220, collection module 230, and analysis module 240. Furthermore, for the purposes of the description below, communication between the various modules may represent passing of values from one software process hosted by the computing element to another software process also hosted by the same computing element.

Memory 250 stores computer instructions for the modules of management node 40, trace parameters 280 input at user interface 210, trace reports 80 received by collection module 230, or any other appropriate information used by management node 40 during operation. Memory 250 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

In operation, an administrator or management device of communication system 10 indicates to management node 40 a desire to trace calls by providing management node 40 with trace parameters 280. Trace parameters 280 may represent any appropriate information describing the trace services requested, such as control protocols to be traced, time constraints on the tracing, and/or any other suitable parameters for the trace. The administrator or management device may provide trace parameters 280 to management node 40 in any appropriate way. For example, the administrator may type trace parameters 280 into management node 40 using a keyboard of user interface 210, direct management node 40 to access stored trace parameters 280 from memory 250, indicate to management node 40 an external storage device on which trace parameters 280 are stored, and/or provide trace parameters 280 to management node 40 in any other suitable manner.

In response to receiving trace parameters 280, management module 220 generates a trace trigger request 70 that includes trace parameters 280. Trace trigger request 70 also includes trace tag 75. Trace tag 75 is used by tracing nodes 30 to mark call signaling messages 50 to be traced. Trace tag 75 additionally describes information to be included in trace reports 80 sent to management node 40 as a result of trace trigger request 70. FIGS. 3 and 4 illustrate the contents of trace trigger request 70 and trace tag 75 in greater detail.

Management module 220 then transmits trace trigger request 70 to one or more tracing nodes 30. Depending on the configuration of communication system 10, management module 220 may transmit trace trigger request 70 to a single predetermined tracing node 30, all tracing nodes 30 in communication system 10, or one or more tracing nodes 30 determined in any appropriate manner. For example, communication system 10 may include a number of communication subsystems operated by various entities or service providers. Particular tracing nodes 30 in communication system 10 may represent peripheral nodes demarcating a boundary of a particular communication subsystem, such as gateways connecting a particular entity's network to a larger multi-entity network, and management module 220 may transmit trace trigger request 70 to all such boundary nodes in the subsystem.

As a result of receiving trace trigger request 70, the receiving tracing node 30 or tracing nodes 30 begin tracing call signaling messages 50 received by that tracing node 30 or those tracing nodes 30 based on information included in trace trigger request 70. Operation of tracing node 30 according to a particular embodiment is described in greater detail with respect to FIG. 5. One or more tracing nodes 30 may also begin transmitting trace reports 80 that include tag specified information pertaining to tagged calls to a particular management node 40 designated by trace tag 75.

Collection module 230 receives trace reports 80 transmitted to management node 40 by tracing nodes 30. Collection module 230 may format, filter, or consolidate trace reports 80 received by management node 40 in any appropriate manner and may then transmit trace reports 80 to analysis module 240 or may store trace reports 80 in memory 250 for later use by analysis module 240 or other components of management node 40. The contents of trace reports 80 received from various tracing nodes 30 may be correlated on a call-by-call or a trace-request-by-trace-request basis by evaluation of a call identifier and request identifier stamped into the logged signaling and diagnostic information.

At an appropriate time, analysis module 240 receives from collection module 230 or retrieves from memory 250 one or more trace reports 80. Analysis module 240 may additionally, process trace reports 80, which may include aggregating, filtering, formatting, and/or processing trace reports 80 in any other suitable manner. Analysis module 240 then provides trace report 80 or portions of trace reports 80 to the administrator in any appropriate manner. Analysis module 240 may display trace reports 80 on a monitor of user interface 210, transmit to administrator an email or other message containing trace reports 80, output trace reports 80 to the management device through a network connection with the management device, or provide trace reports 80 to the administrator or management device in any other suitable manner.

FIG. 3 illustrates the contents of a particular embodiment of trace trigger request 70. As indicated above, trace trigger request 70 may represent any form of message or signal appropriate for management node 40 to request tracing services from tracing nodes 30. In a particular embodiment, trace trigger request 70 represents an XML message. In the illustrated embodiment, trace trigger request 70 includes trace tag 75 and trace criteria 310. Trace tag 75 is used to mark trace call signaling messages 50 and additionally provides reporting parameters for the particular tracing node 30 that received the trace trigger request 70 and the downstream tracing nodes 30 that subsequently receive trace tag 75 included in tagged call signaling messages 50. FIG. 4 describes the contents of a particular embodiment of trace tag 75.

Trace criteria 310 provide information that describes to tracing nodes 30 the tracing services requested. In the illustrated embodiment, trace criteria 310 include trace protocol type 320, trace message type 330, trace parameter criteria 340, trace sub-parameter criteria 350, trace event trigger 360, trace start time 370, trace stop time 380, trace counter 390, and frequency indicator 400. In a particular embodiment, trace criteria 310 represents an XML element and trace protocol type 320, trace message type 330, trace parameter criteria 340, trace sub-parameter criteria 350, trace event trigger 360, trace start time 370, trace stop time 380, trace counter 390, and frequency indicator 400 represent XML sub-elements.

Trace criteria 310 may specify to tracing nodes 30 calls to be traced. For example, in the illustrated embodiment, protocol type 320 identifies one or more signaling protocols, such as SIP, H.323, MGCP, SCCP (Skinny Client Control Protocol or Signaling Connection Control Part), BICC, or NSS, to be evaluated by tracing nodes 30. Trace message type 330 specifies particular types of call signaling messages 50 to be evaluated within the identified signaling protocol or protocols. Trace parameter criteria 340 identifies a specific parameter or header and a value for that parameter or header and instructs tracing nodes 30 to trace calls with the specified value for the specified header or parameter. Trace sub-parameter criteria 350 identifies a specific sub-parameter and a value for that sub-parameter and instructs tracing nodes 30 to trace calls with the specified value for the specified sub-header.

Additionally, trace criteria 310 may describe to tracing nodes 30 other conditions or parameters of the tracing services requested. For example, in the illustrated embodiment, trace event trigger 360 defines an event or condition, such as the detection of a particular type of alarm or the storage in call context of a specific destination address falling within a range address trigger, that should initiate the requested tracing services. Trace criteria 310 also may specify a node type. Tracing node 30 may begin performing the tracing described by trace criteria 310 once the event specified by trace event trigger has occurred. Trace start time 370 and trace stop time 380 specify a start and stop time over which tracing nodes 30 should perform the tracing. Trace counter 390 specifies a total number of calls that should be traced before tracing nodes 30 terminate the tracing services associated with trace trigger request 70. Frequency indicator 400 specifies a value N which tracing node 30 may use to determine the frequency of call tracing. For example, tracing node 30 may trace only every Nth call in order to implement sampling.

FIG. 4 illustrates the contents of trace tag 75 according to a particular embodiment. Appropriate tracing nodes 30 modify call signaling messages 50 by adding trace tag 75. Trace tag 75 specifies for tracing nodes 30 downstream from a particular tracing node 30 that received trace trigger request 70 what call information should be traced. As a result, a particular tracing node 30 receiving trace trigger request 70 may propagate tracing information to downstream nodes by attaching trace tag 75 to call signaling messages 50. Furthermore, downstream tracing nodes 30 report the presence of trace tag 75 in call signaling messages 50. Thus, trace tag 75 may both mark traced call signaling messages 50 and also provide information indicating how tracing nodes 30 should report the traced call signaling messages 50.

Trace tag 75 may include any information to facilitate the propagation of tracing information. The illustrated embodiment of trace tag 75 includes a unique identifier 410 and a trace scope parameters 430 that identify the associated trace trigger request 70 and describe the constraints of that trace trigger request 70. Additionally, in particular embodiments, tracing node 30 may incorporate the original trace trigger request 70 in trace tag 75 when attaching trace tag 75 to call signaling messages 50. Furthermore, a particular tracing node 30 may incorporate trace report 80 to transmit trace report 80 to a tracing node 30 that can transmit trace report 80 to management node 40. As a result, under certain circumstances, trace tag 75 in a particular embodiment may include trace trigger request field 460 and/or trace report field 470. To control the distance downstream that trace tag 75 is propagated, trace tag 75 may also include a time-to-live parameter 440.

Unique identifier 410 may represent any combination of information that allows tracing nodes 30, management node 40 and/or other components of communication system 10 to uniquely identify the trace trigger request 70 associated with trace tag 75 and/or the particular management node 40 that generated trace tag 75. Unique identifier 410 may include additional information to allow management node 40 to distinguish between trace tag 75 generated as a result of the same trace trigger request 70. In the illustrated embodiment, unique identifier 410 includes a call identifier 412, a problem identifier 414, a request time 416, a requester identifier 418, a requestor domain name 420, and a trace sequence number 422.

Call identifier 412 represents a unique identifier for the traced information associated with a given call. A particular trace report 80 specific to a given call may include call identifier 412 to identify the call that triggered trace report 80. Call identifier 412 may be added to trace tag 75 when tracing node 30 attaches trace tag 75 to call signaling message 50. If multiple calls meet trace criteria 310, call identifier 412 may enable management node 40 to sort the multiple trace reports 80 received in response to a single trace trigger request 70. Problem identifier 414 identifies the trace trigger request 70 that originally included trace tag 75. A particular trace trigger request 70 may include multiple sets of trace criteria and problem identifier can be used to identify all of the call traces associated with a given trace trigger request 70. Request time 416 identifies the time at which the trace trigger request 70 was generated and allows management node 40 or other components to search or sort trace tags 75 based on the time trace trigger request 70 was created.

Requestor identifier 418 and requester domain name 420 identify the particular management node 40 that generated trace trigger request 70. Requestor domain name 420 specifies a fully-qualified domain name (FQDN) for the requesting management node 40 and requester identifier 418 provides a unique identifier for management node 40 within the network associated with the FQDN. Trace sequence number 422 identifies a number of branches trace trigger request 70 has taken in traveling the path and/or specific tracing nodes 30 through which trace trigger request 70 has propagated. Additionally, trace sequence number 422 may be incremented to show the branching of trace trigger request 70 through the topology. For example, if management node 40 transmits trace trigger request 70 to multiple tracing nodes 30, management node 40 may include a different initial value for trace sequence number 422 in each trace trigger request 70. More specifically, management node 40, in this example, may transmit trace trigger requests 70 to three tracing nodes 30 and may include an initial trace sequence number 422 of "1000", "2000", and "3000" in the particular trace trigger requests 70 sent, respectively, to a first, second, and third tracing node 30. Downstream tracing nodes 30 may then increment these trace sequence numbers 422 (for example, to "1001", "2001", and "3001", respectively). Thus, when management node 40 subsequently receives trace reports 80 containing these trace sequence numbers 422, management node 40 may be able to determine how far trace tag 75 propagated from a particular tracing node 30.

As a result of the described elements, in particular embodiments, unique identifier 410 may be problem unique, distinguishing between trace trigger requests 70; call unique, distinguishing between multiple calls traced as a result of the same trace trigger request 70; temporally unique, allowing for temporal scoping of views; and spatially unique, distinguishing between requesting management nodes 40.

Trace scope parameters 430 include information defining the scope of the requested tracing services. In general, trace scope parameters 430 may specify the parameters of the requested tracing services in any appropriate manner. In the illustrated embodiment, trace scope parameters 430 includes protocol stain 432, report protocol 434, report zone 436, report level 438, and report target 439. Protocol stain 432 specifies the protocols for which call signaling messages 50 are tagged by tracing nodes 30. Report protocol 434 identifies the protocols for which tracing node 30 will report call signaling messages 50 that are tagged and/or call signaling messages 50 matching trace criteria 310. As a result, tracing node 30 may receive tagged call signaling messages 50 on one layer and report on call signaling messages 50 received on other layers. For example, tracing node 30 may receive a tagged call control message 50 on the call control layer, such as a SIP message, that includes trace tag 75 with report protocol 434 that identifies a device control protocol, such as MGCP, for which call signaling messages 50 should be reported. Tracing node 30 may then generate trace reports 80 for MGCP call control messages 50 received by tracing node 30.

Additionally, depending on the configuration of tracing node 30 and/or the contents of a particular trace trigger request 70, tracing node 30 may tag all, one, or any suitable subset of call signaling messages 50 of the protocol specified by protocol stain 432 for a call matching trace criteria 310. For example, for a particular call with call signaling messages 50 that match trace criteria 310, tracing node 30 may tag all call signaling messages 50 that match the protocol of protocol stain 432. For another call with call signaling messages 50 that match trace criteria 310, tracing node 30 may tag only the first call signaling message 50 of the specified protocol that tracing node 30 receives for that call. Tracing node 30 may determine which matching call signaling messages 50 to tag based on information in trace trigger request 70, the configuration of tracing node 30, or any other appropriate considerations. Similarly, tracing node 30 may generate reports for all, one, or any appropriate subset of call signaling message 50 of the protocol specified by report protocol 434 that match trace criteria 310 or contain trace tag 75. Tracing node 30 may determine which call signaling messages 50 to report based on information in trace trigger request 70, the configuration of tracing node 30, or any other appropriate considerations.

Report zone 436 describes particular zones of communication system 10 which are requested to report. Report level 438 specifies a level of detail requested for trace report 80. Report target 439 specifies a particular management node 40 to which trace reports 80 are to be transmitted. As a result, in a particular embodiment of communication system 10 that includes multiple management nodes 40, a first management node 40 may transmit trace trigger request 70 that includes report target 439 specifying a second management node 40 to receive trace reports 80.

As noted above, trace trigger request 70 and/or trace report 80 may be incorporated into trace tag 75 to allow tracing node 30 to propagate information from trace trigger request 70 or to transmit trace report 80 to a tracing node 30 configured to report to management node 40. In the illustrated embodiment, trace tag 75 includes trace trigger request field 460. Trace trigger request field 460 may include trace trigger request 70, portions of trace trigger request 70, a pointer to trace trigger request 70, or a link, such as a uniform resource location (URL), to a location where the rest of the trace trigger request 70 can be downloaded, or any other information describing trace trigger request 70. Tracing node 30 may also include a particular trace report 80, portions of trace report 80, a pointer to trace report 80, or a link to a location where trace report 80 can be downloaded, or may reference trace report 80, in any other appropriate manner, or any other information that describes trace report 80. Additionally, because multiple tracing nodes 30 may modify trace tag 75 as the associated call signaling message 50 traverse communication system 10, trace report field 470 may incorporate or reference, for example through links, one or more trace reports 80 generated by one or more different tracing nodes 30.

Trace tag 75 may also include time-to-live parameter 440. Management node 40 may request that trace tag 75 only be propagated a certain distance downstream. Time-to-live parameter 440 may define the number of hops that trace tag 75 should be propagated. The Time-to-live parameter 440 may be decremented at each tracing node 30 or node 35. Tracing nodes 30 may then remove trace tag 75 from call signaling messages 50 once time-to-live parameter 440 reaches zero. Alternatively, time-to-live parameter 440 may be incremented at each tracing node 30 or node 35. Tracing nodes 30 may then remove trace tag 75 from call signaling messages 50 once time-to-live parameter 440 reaches a predetermined maximum.

FIG. 5 illustrates the contents and operation of a particular embodiment of tracing node 30 in greater detail. Tracing node 30 traces information requested by trace tag 75 and reports this information to a particular management node 40 specified by trace tag 75. Additionally, tracing node 30 may modify particular call signaling messages 50 to propagate trace tags 75 to tracing nodes 30 located downstream. Tracing node 30 includes a management interface module 510, a tagging module 520, a filter module 530, a reporting module 550, an erasing module 540, and a call control module 560. Although FIG. 5 illustrates a particular embodiment of tracing node 30 that includes particular components and provides particular functionality, particular embodiments of tracing node 30 may not include all components shown. Furthermore, communication system 10 may incorporate a number of procedures to compensate for tracing nodes 30 that do not support particular functions, as described in greater detail below.

Management interface module 510 receives trace activation messages 60 and trace trigger requests 70 from management node 40 that initiate tracing services. Call control module 560 receives call signaling messages 50 from neighboring tracing nodes 30 and nodes 35 and transmits call signaling messages 50 to the next node downstream in the path of that particular call signaling messages 50. Filter module 530 identifies call signaling messages 50 received by call control module 560 that match trace criteria. Tagging module 520 modifies call signaling messages 50 identified by filter module 530 by adding trace tag 75. Reporting module 550 reports the receipt of a tagged call signaling message 50 to management node 40. Erasing module 540 eliminates trace tags 75 from appropriate call signaling messages 50.

Management interface module 510, call control module 560, filter module 530, tagging module 520, reporting module 550, and erasing module 540 may each include any combination of components, including hardware and/or software, suitable for providing the described functionality. Additionally, the functionality described for any one or more of management interface module 510, call control module 560, filter module 530, tagging module 520, reporting module 550, and erasing module 540 may be provided by shared or physically integrated components or by the same component or group of components. In a particular embodiment, tracing node 30 includes a computing element, such as a microprocessor, and management interface module 510, call control module 560, filter module 530, tagging module 520, reporting module 550, and erasing module 540 each represent, in part or in whole, software processes running on the computing element. As a result, in such an embodiment, the computing element may provide some or all of the functionality described for each of management interface module 510, call control module 560, filter module 530, tagging module 520, reporting module 550, and erasing module 540. Furthermore, for the purposes of the description below, communication between the various modules may represent passing of values from one software process hosted by the computing element to another software process also hosted by the same computing element.

Memory 570 stores computer instructions for the functional modules of tracing node 30, trace criteria 310 for filtering call signaling messages 50, trace tag 75 for tagging call signaling messages 50, trace reports 80 to be transmitted to management node 40 or another tracing node 30, or any other appropriate information used by tracing node 30 during operation. In particular embodiments, memory 570 may also represent portions or all of a buffer 580 used to store information regarding a state of tracing node 30 and previous states of tracing node 30. Memory 570 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

In operation, tracing node 30 receives trigger activation message 60 from management node 40. Tracing node 30 activates tracing functionality of tracing node 30 in response to receipt of trigger activation message 60. As part of activating tracing functionality, tracing node 30 begins monitoring for receipt of trace trigger requests 70 by management interface module 510 and tagged call signaling messages 50 by call control module 560. As discussed above, in particular embodiments, tracing node 30 may be configured in such a manner that tracing functionality is activated by default. In such an embodiment, tracing node 30 may monitor for trace trigger requests 70 or tagged call signaling messages 50 regardless of whether tracing node 30 has received trace activation message 60.

Once tracing functionality has been activated, whether activated in response to trace activation message 60 or based on a default configuration, management interface module 510 begins monitoring for trace trigger requests 70 and any call signaling message 50 containing trace tag 75. When management interface module 510 receives trace trigger request 70, management interface module 510 extracts trace criteria 310 and trace tag 75 from trace trigger request 70. Management interface module 510 transmits trace criteria 310 to filter module 530 and trace tag 75 to tagging module 520. Filter module 530 and tagging module 520 store trace criteria 310 and trace tag 75, respectively, in memory 570.

When call control module 560 receives call signaling message 50, call control module 560 forwards call signaling message 50 to filter module 530. In particular embodiments, filter module 530 filters call signaling messages 50 by determining, based on parameter values and other characteristics of call signaling message 50, whether call signaling message 50 matches trace criteria 310. For the purposes of this description, filter module 530 may determine whether call signaling message 50 matches trace criteria 310 by determining whether parameters, values, headers, characteristics, properties, or attributes of call signaling message 50 are equal to, equivalent to, inclusive of, a subset of, comparable to, within a range specified by, or otherwise match, in any other appropriate manner, one or more of trace criteria 310. A match may occur either immediately when node 30 receives a message, or after node 30 processes the message via mechanisms such as address translation.

In alternative embodiments, only particular tracing nodes 30 are designated to perform filtering and only those tracing nodes 30 compare received call signaling messages 50 to stored trace criteria 310. Other tracing node 30 may check only for the presence of trace tag 75 in call signaling messages 50 as described below. For example, communication system 10 may include one or more ingress tracing nodes 30 on the boundary of communication system 10 and other communication systems or networks. To limit redundant processing, communication system 10 may be configured so that only these ingress tracing nodes 30 filter and tag call signaling messages 50. Tracing nodes 30 on the interior of communication system 10 may be configured to only check for the presence of trace tags 75 in call signaling messages 50 and report trace tags 75 to management node 40. The remainder of this description, however, assumes that tracing node 30 is configured to filter, tag, and report.

If the received call signaling message 50 matches trace criteria 310, filter module 530 sends call signaling message 50 to tagging module 520. If tracing node 30 has received multiple trace trigger requests 70, filter module 530 may be configured to compare call signaling messages 50 to multiple sets of trace criteria 310. If so, filter module 530 may forward the matching trace criteria 310 with call signaling messages 50 or otherwise indicate to tagging module 520 the trace trigger request 70 of the matching trace criteria 310.

Tagging module 520 receives call signaling message 50 and identifies a particular trace tag 75 stored in memory 570 that is associated with the matching trace criteria 310. Tagging module 520 then tags call signaling messages 50 by attaching the identified trace tag 75 to call signaling message 50. For the purposes of this description, "attaching" any type of information to a message may represent appending the information to the message, embedding the information within the message, incorporating a link to the information in the message, generating a new message that includes information from the original message and the information to be attached, or associating the information with the message in any other appropriate manner.

Tagging module 520 then forwards the tagged call signaling message 50, or a copy of the tagged call signaling message 50, to reporting module 550. Tagging module 520 may also then return call signaling message 50 directly to call control module 560 or to filter module 530 which then forwards call signaling message 50 to call control module 560.

Figure 6:
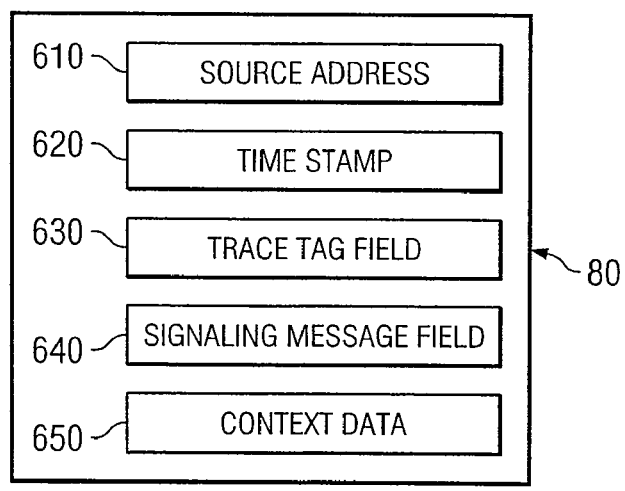
FIG. 6 illustrates contents of a trace report according to a particular embodiment.

Reporting module 550 receives the tagged call signaling message 50 and generates trace report 80 based on call signaling message 50. Trace report 80 identifies the particular trace tag 75 included in the tagged call signaling message 50 that triggered generation of trace report 80, additional information describing the state of tracing node 30, and/or information describing how call signaling message 50 was processed by tracing node 30. Additionally, in particular embodiments reporting module 550 may access buffer 580 that stores information pertaining to previous states of tracing node 30 and may include this information in trace report 80. FIG. 6 below illustrates the contents of trace report 80 in greater detail. In a particular embodiment, reporting module 550 then transmits trace report 80 to management node 40.

In alternative embodiments, tracing node 30 may not be configured to transmit trace reports 80 to management node

40. In such an embodiment, tracing node 30 may instead forward trace report 80 to tagging module 520 or another component of tracing node 30. Tagging module 520 or the appropriate component may then attach trace report 80 to call signaling message 50 for tunneling to other tracing nodes 30 with report transmitting capabilities.

Returning to the operation of filter module 530, if instead call signaling message 50 does not match trace criteria 310, filter module 530 determines whether call signaling message 50 contains trace tag 75. If call signaling message 50 contains trace tag 75, filter module 530 transmits a copy of call signaling message 50 to reporting module 550. Reporting module 550 receives call signaling message 50 and generates trace report 80 based on call signaling message 50. FIG. 6 below illustrates the contents of trace report 80 in greater detail.

Additionally, if call signaling message 50 contains trace tag 75, filtering module 50 may also determine that, under appropriate circumstances, removal of trace tag 75 is appropriate. For example, if tracing node 30 is located on the boundary of a particular subsystem, tracing node 30 may be configured to prevent trace tag 75 from propagating to nodes 35 and tracing node 30 external to the subsystem. If the removal of trace tag 75 is appropriate, tracing node 30 transmits call signaling message 50 to erasing module 540. Erasing module 540 eliminates trace tag 75 from call signaling message 50 and transmits call signaling message 50 either directly to call control module 560 or back to filtering module for subsequent transmission to call control module 560.

After tracing node 30 has completed any trace-related processing of call signaling message 50, filtering module 30 transmits call signaling message 50 to call control module 560. Call control module 560 performs any appropriate processing on call control module 560, including any telephony-related processing appropriate based on the protocol and message-type of call signaling message 50. Call control module 560 then transmits call signaling message 50 to the next downstream tracing node 30 or node 35.

As noted above, particular embodiments of tracing node 30 may not be configured to receive trace trigger requests 70 from management node 40. Additionally, in particular embodiments, tracing node 30 may be configured to receive trace trigger requests 70 in call signaling messages 50. Thus, particular embodiments of tracing nodes 30 that are configured to receive trace trigger requests 70 directly from management node 40 may also be configured to attach received trace trigger requests 70 to call signaling messages 50 to propagate the received trace trigger requests 70 downstream. Downstream tracing nodes 30 may be able to extract trace trigger requests 70 from received call signaling messages 50.

Thus, particular embodiments of tracing node 30 may perform additional processing of call signaling messages 50. Tracing nodes 30 that are operable to receive trace trigger requests 70 directly from management node 40 may attach trace trigger request 70 to call signaling messages 50 before transmitting call signaling messages 50 to downstream tracing nodes 30. Any suitable module of tracing node 30 may perform this processing in any appropriate manner. For example, tagging module 520 may incorporate trace trigger request 70 to trace tag 75 when attaching trace tag 75 to call signaling messages 50. Furthermore, tracing nodes 30 may be configured to check for trace trigger requests 70 in received call signaling messages 50. If trace trigger request 70 is identified in a particular call signaling message 50, call signaling message 50 may be transmitted to filter module 530. Filter module 530 may then extract trace criteria from call signaling message 50 as described above.

In a particular embodiment, use of tagging may increase the vulnerability of communication system 10 to distributed denial of service (DDoS) attacks because tagging may expose network topology. As a result, tracing node 30 may additionally perform a number of tasks related to system security. For example, tracing node 30 may strip trace tags 75 from call signaling messages 50 received from non-trusted sources. Tracing node 30 may also encrypt trace reports 80 transmitted to management node 40 and may be configured to receive encrypted trace trigger requests 70 from management node 40 to ensure confidentiality. Moreover, tracing node 30 may perform encryption-based authentication of call signaling messages 50 received by tracing node 30. In general, tracing node 30 may perform any appropriate steps to increase security of communication system 10 in conjunction with performing the described tracing services.

As a result, particular embodiments of tracing node 30 may provide flexible tracing services. Additionally, particular embodiments may provide a method of receiving and propagating tracing information that allows for integration of tracing node 30 with non-compatible components within communication system 10. Additionally, particular embodiments may offer additional features that limit the possibility of unauthorized parties exploiting trace tag 75 to compromise system security.

FIG. 6 illustrates contents of trace report 80 according to a particular embodiment. When tracing node 30 receives call signaling messages 50 with trace tag 75, tracing node 30 may generate trace report 80 to provide management node 40 the requested diagnostic information for the call. In the illustrated embodiment, trace report 80 includes a source address 610 and a timestamp 620 to allow tracing node 30 to determine a source and time at which trace report 80 was generated. Additionally, depending on the configuration of communication system 10, trace report 80 may also include any appropriate information to allow management node 40 to determine the state of the reporting tracing node 30, of other components in communication system 10, or of the traced call signaling message 50 at the time tracing node 30 generated trace report 80. For example, in a particular embodiment, trace report 80 includes trace tag field 630, message fields 640, and/or context data 650, as described below.

Source address 610 identifies the tracing node 30 that represents the source tracing node 30 that generated trace report 80. Source address 610 may include any form of address or other identifier suitable for use based on the configuration and characteristics of communication system 10. In a particular embodiment, source address 610 specifies a platform, subsystem, and module that generated trace report 80. Additionally, in particular embodiments of communication system 10, particular tracing nodes 30 may not support the transmission of trace reports 80 to management node 40. As a result, these tracing node 30 may instead attach trace reports 80 to call signaling messages 50 to tunnel trace reports 80 to tracing nodes 30 that do support transmission to management node 40. Thus, source address 610 may not identify the tracing node 30 from which management node 40 received trace report 80, but instead the tracing node 30 that initially generates trace report 80.

Timestamp 620 identifies the time at which trace report 80 was generated. Timestamp 620 may identify the time as an absolute measure or as a time value relative to some reference time. For example, in a particular embodiment, timestamp 620 may identify the time of generation relative to the time when trace trigger request 70 was issued.

As noted above, trace report 80 may provide information pertaining to the state of the reporting tracing node 30, of other components in communication system 10, or of the traced call signaling message 50. For example, in a particular embodiment, trace report 80 includes trace tag field 630, signaling message field 640, and context data 650. Trace tag field 630 includes a copy of the particular trace tag 75 that triggered trace report 80, portions of that trace tag 75, a pointer to trace tag 75, or a link to a location where trace tag 75 may be downloaded, or may incorporate into trace tag field 630, in any other appropriate manner, information from the relevant trace tag 75.

Signaling message fields 640 may comprise a trace of call signaling messages 50 received by tracing node 30 that are of the protocol or protocols specified by trace tag 75. Each signaling message field 640 may include a copy of a matching call signaling message 50, portions of that call signaling message 50, a pointer to that call signaling message 50, or a link to a location where that call signaling message 50 may be downloaded, or may incorporate into trace tag field 630, in any other appropriate manner, information from the relevant call signaling message 50. Additionally, signaling message field 640 may include call signaling message 50 or information from call signaling message 50 in the form in which call signaling message 50 is received, output to downstream tracing nodes 30, or transmitted to ancillary components, such as a media processing server, for service. Thus, trace report 80 may or may not reflect changes to call signaling message 50 made by the reporting tracing node 30, depending on the configuration of communication system 10 and/or the parameters of trace trigger request 70.

Context data 650 may describe a state of tracing node 30 when tracing node 30 received call signaling messages 50 or a log of multiple states of tracing node 30 before or after receipt of call signaling messages 50. For example, context data 650 may describe a sub-component that processed call signaling message 50, whether the processing was successful, and/or any exception handling of call signaling message 50. Context data 650 may describe alarms, events, state changes, logged records, and/or session detail records associated with the relevant trace tag 75. The amount of detail included in context data 650 may be determined by report level 438 of trace tag 75 that triggered trace report 80. Additionally, as described above with respect to FIG. 5, tracing node 30 may include a circular buffer that allows tracing node 30 to store and report information about the state of tracing node 30 prior to receipt of the relevant call signaling message 50. As a result, context data 650 may also include information describing a prior state of tracing node 30.

Although FIGS. 3, 4, and 6 illustrate, respectively, contents of trace trigger request 70, trace tag 75, and trace report 80 as utilized by a particular embodiment of communication system 10, communication system 10 may be configured to use any suitable form of trace trigger request 70, trace tag 75, and trace report 80 containing information appropriate for the operation of that particular embodiment of communication system 10 and structured in any appropriate manner. For example, although the above description illustrates an embodiment of tracing node 30 that tunnels trace trigger request 70 and trace report 80 as fields within trace tag 75, in a particular embodiment of communication system 10, tracing node 30 may attach to trace trigger request 70, trace tag 75, and trace report 80 to call signaling message 50 as separate fields or data objects of call signaling message 50. As another example, tracing node 30 may attach a single data object to call signaling message 50 that includes a separate field containing trace trigger request 70, trace tag 75, and trace report 80.

FIG. 7 is a flowchart illustrating operation of a particular embodiment of tracing node 30 in receiving trace activation messages 60 and trace trigger request 70. In the described embodiment, tracing node 30 is assumed to be capable of receiving trace trigger request 70 directly from management node 40 and propagating trace tags 75 and tunneling trace trigger request 70 to downstream tracing nodes 30 by way of call signaling messages 50. For the sake of simplicity, tracing node 30 is illustrated as maintaining only one set of trace criteria 340 at a time. Alternative embodiments of tracing node 30 may utilize any appropriate number of trace criteria 340 contemporaneously. Additionally, management node 40 is assumed to allow existing trace criteria 340 in tracing node 30 to expire before deactivating trace functionality. In alternative embodiments of communication system 10, management node 40 may be capable of canceling existing trace trigger requests 70 by transmitting a trace deactivation message to tracing node 30 before trace trigger request 70 expires.

At step 710, tracing node 30 receives trace activation message 60. In response to trace activation message 60, tracing node 30 activates tracing functionality of tracing node 30 at step 720. At step 730, tracing node 30 determines whether tracing node 30 has received trace trigger request 70. If not, the process continues at step 770. If tracing node 30 has received trace trigger request 70, tracing node 30 extracts trace tag 75 and trace criteria 340 from trace trigger request 70 and stores trace tag 75 and trace criteria 340 for subsequent use at step 740.

Tracing node 30 then begins tracing calls by comparing call signaling messages 50 to trace criteria 340 and tagging matching call signaling messages 50 with trace tag 75 at step 750. This process is illustrated in greater detail in FIG. 8. At step 760, tracing node 30 determines whether trace criteria 340 stored by tracing node 30 has expired. If trace criteria 340 has not expired, tracing node 30 continues matching call signaling messages 50 to trace criteria 340, returning to step 750.

If trace criteria 340 has expired, tracing node 30 determines whether tracing node 30 has received a trace deactivation message at step 770. If tracing node 30 has not received a trace deactivation message, the process returns to step 730. If tracing node 30 has received a deactivation message, tracing node 30 deactivates tracing functionality of tracing node 30 at step 780.

Figure 8:
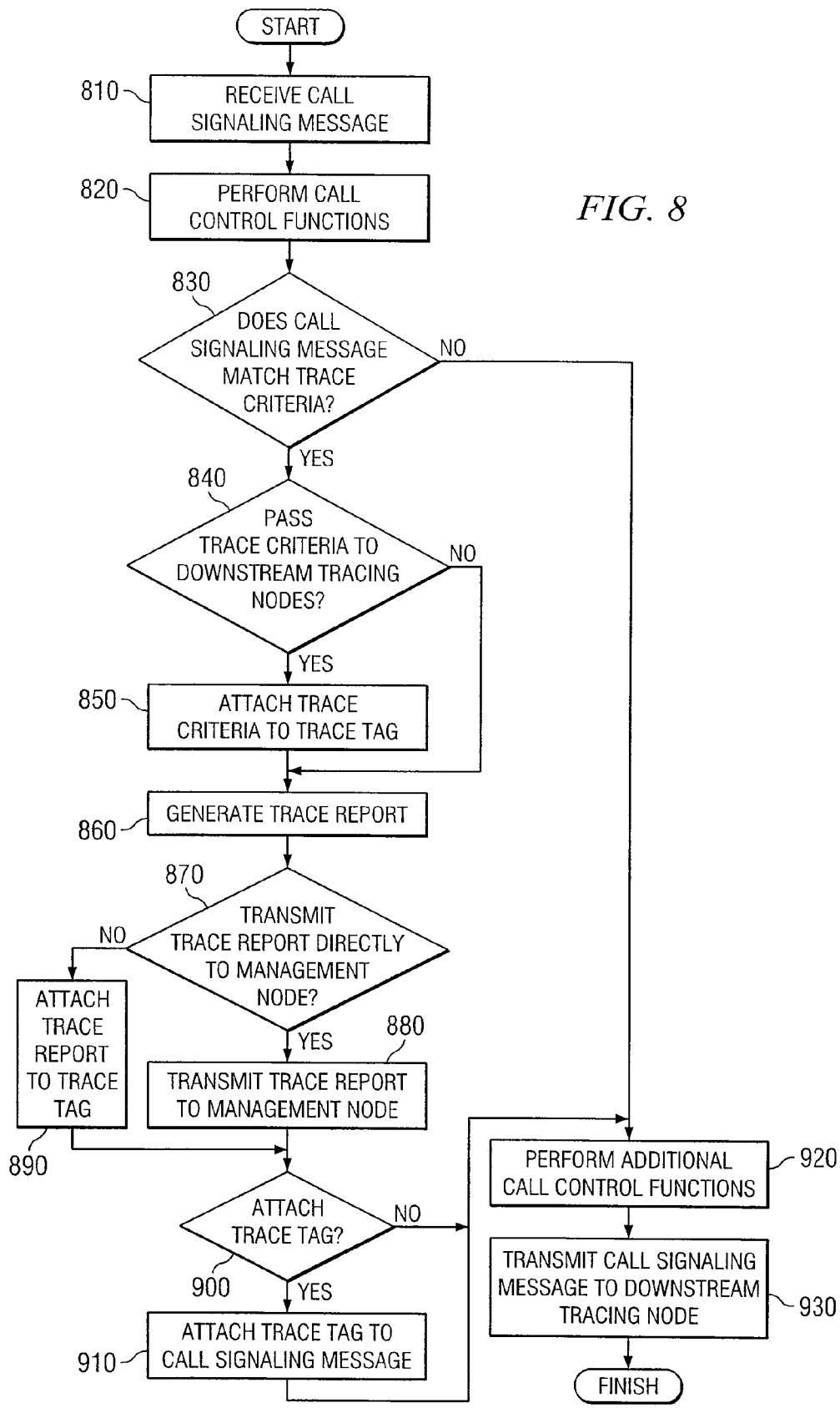
FIG. 8 is a flowchart further illustrating operation of a particular embodiment of the tracing node.

FIG. 8 is a flowchart illustrating operation of tracing node 30 in processing call signaling messages 50. FIG. 8 illustrates operation of tracing node 30 after tracing node 30 has activated tracing functionality and has received trace criteria 340 as part of a trace trigger request 70.

At step 810, tracing node 30 receives call signaling message 50. At step 820, tracing node 30 performs appropriate call control functions. At step 830, tracing node 30 determines whether call signaling message 50 matches trace criteria 340. If call signaling message 50 does not match trace criteria 340, tracing node 30 proceeds to step 920.

If call signaling message 50 does match trace criteria 340, tracing node 30 determines whether to pass trace criteria 340 to one or more downstream tracing node 30 at step 840. If tracing node 30 decides to pass trace criteria 340 to one or more downstream tracing node 30, tracing node 30 attaches trace criteria 340 to trace tag 75 at step 850.

At step 860, tracing node 30 generates trace report 80. At step 870, tracing node 30 determines whether tracing node 30 is configured to transmit trace report 80 directly to management node 40. If so, tracing node 30 transmits trace report 80 to management node 40 at step 880. If not, tracing node 30 attaches trace report 80 to trace tag 75 at step 890.

At step 900, tracing node 30 determines whether to attach trace tag 75 to call signaling message 50. A particular embodiment of tracing node 30 may be configured to only report on call signaling messages 50 that match trace criteria 340 and not to tag matching call signaling messages 50. If tracing node 30 decides to tag call signaling message 50, tracing node 30 attaches trace tag 75 to call signaling message 50 at step 910.

At step 920, tracing node 30 may perform additional call control functions with respect to call signaling message 50. At step 930, tracing node 30 then transmits call signaling message 50 to downstream tracing node 30.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. For example, many protocols support an informational type of signal. A particular embodiment of tracing node 30 may be configured to propagate trace trigger request 70 and trace report 80 as a no-op information signal in order to send trace trigger request 70 and trace report 80 independently of the protocol's normal signaling.

What is claimed is:

1. A method for tracing communications, comprising:
   receiving a call signaling message from a first remote element;
   determining whether the call signaling message includes a trace tag;
   in response to determining that the call signaling message includes a trace tag:
      transmitting a trace report to a second remote element; and
      incrementing a trace call counter associated with the trace tag.

2. The method of claim 1, wherein determining whether the call signaling message includes a trace tag comprises:
   adjusting a time-to-live parameter of the trace tag;
   determining whether the time-to-live parameter of the trace tag equals a predetermined value and
   removing the tag from the call signaling message if the time-to-live parameters of the trace tag equals the predetermined value.

3. The method of claim 1, wherein:
   the trace tag specifies a report zone;
   receiving the call signaling message comprises receiving the call signaling message at a trace node; and
   transmitting the trace report comprises:
      determining whether the tracing node is within the report zone; and
      transmitting the trace report to the second remote element if the call signaling message includes a trace tag and the tracing node is within the report zone.

4. The method of claim 1, wherein:
   the trace tag includes a report level that specifies one or more types of information to be reported; and
   transmitting the trace report comprises:
      generating a trace report based on the report level if the call signaling message includes a trace tag; and
      transmitting the trace report to the second remote element.

5. The method of claim 1, wherein:
   the trace tag specifies an address; and
   transmitting the trace report to the second remote element comprises transmitting the trace report to the address.

6. The method of claim 1, wherein transmitting the trace report comprises transmitting a first trace report to the second remote element if the call signaling message includes a trace tag, and further comprising:
   determining whether the call signaling message includes a second trace report; and
   transmitting the second trace report to the second remote element if the call signaling message includes the second trace report.

7. The method of claim 1, wherein transmitting the trace report comprises attaching a first trace report to the call signaling message if the call signaling message includes a trace tag, and further comprising:
   determining whether the call signaling message includes a second trace report;
   if the call signaling message includes a second trace report:
      adjusting a time-to-live value of the second trace report;
      determining whether the time-to-live value of the second trace report is equal to some predetermined value; and
      removing the second trace report from the call signaling message if the time-to-live value of the second trace report is equal to the predetermined value; and
   transmitting the call signaling message to a third remote element downstream along a path associated with the call signaling message.

8. The method of claim 1, wherein:
   the trace tag specifies a report protocol; and
   transmitting the trace report comprises transmitting the trace report to the second remote element if the call signaling message includes the trace tag and a protocol of the call signaling message matches the report protocol.

9. The method of claim 1, wherein transmitting the trace report comprises:
   generating a trace report comprising a source address that identifies a tracing node that received the call signaling message, a report timestamp that identifies a time at which the trace report was generated, a signaling message field that identifies a message type of call signaling message, and context data which describes a state of a tracing node that received the call signaling message; and
   transmitting the trace report to the source address.

10. The method of claim 9, wherein generating the trace report comprises generating the trace report that includes context data which describes a plurality of states of the tracing node occurring prior to receipt of the call signaling mode by the tracing node.

11. Logic for tracing communications embodied in computer-readable media, the logic being operable, when executed on a processor, to:
   receive a call signaling message from a first remote element;
   determine whether the call signaling message includes a trace tag;
   in response to determining that the call signaling message includes a trace tag:
      transmit a trace report to a second remote element; and
      increment a trace call counter associated with the trace tag.

12. The logic embodied in computer-readable media of claim 11, wherein the computer program is operable to determine whether the call signaling message includes a trace tag by:
   adjusting a time-to-live parameter of the trace tag;
   determining whether the time-to-live parameter of the trace tag equals a predetermined value and removing the tag from the call signaling message if the time-to-live parameters of the trace tag equals the predetermined value.

13. The logic embodied in computer-readable media of claim 11, wherein:
the trace tag specifies a report zone;
receiving the call signaling message comprises receiving the call signaling message at a tracing node;
the computer program is operable to transmit the trace report by:
determining whether a tracing node that received the call signaling message is within the report zone; and
transmitting the trace report to the second remote element if the call signaling message includes a trace tag and the tracing node is within the report zone.

14. The logic embodied in computer-readable media of claim 11, wherein:
the trace tag includes a report level that specifies one or more types of information to be reported; and
the computer program is operable to transmit the trace report by:
generating the trace report based on the report level if the call signaling message includes a trace tag; and
transmitting the trace report to the second remote element.

15. The logic embodied in computer-readable media of claim 11, wherein:
the trace tag specifies an address; and
the computer program is operable to transmit the trace report to the second remote element by transmitting the trace report to the address.

16. The logic embodied in computer-readable media of claim 11, wherein
the computer program is operable to transmit the trace report by transmitting a first trace report to the second remote element if the call signaling message includes a trace tag; and
the computer program is further operable to:
determine whether the call signaling message includes a second trace report; and
transmit the second trace report to the second remote element if the call signaling message includes the second trace report.

17. The logic embodied in computer-readable media of claim 11, wherein:
the computer program is operable to transmit the trace report by attaching a first trace report to the call signaling message if the call signaling message includes a trace tag; and
the computer program is further operable to:
determine whether the call signaling message includes a second trace report;
if the call signaling message includes a second trace report:
adjust a time-to-live value of the second trace report;
determine whether the time-to-live value of the second trace report is equal to some predetermined value; and
remove the second trace report from the call signaling message if the time-to-live value of the second trace report is equal to the predetermined value; and
transmit the call signaling message to a third remote element downstream along a path associated with the call signaling message.

18. The logic embodied in computer-readable media of claim 11, wherein:
the trace tag specifies a report protocol; and
the computer program is operable to transmit the trace report by transmitting the trace report to the second remote element if the call signaling message includes the trace tag and a protocol of the call signaling message matches the report protocol.

19. The logic embodied in computer-readable media of claim 11, wherein the computer program is operable to transmit the trace report by:
generating the trace report comprising a source address that identifies a tracing node that received the call signaling message, a report timestamp that identifies a time at which the trace report was generated, a signaling message field that identifies a message type of call signaling message, and context data which describes a state of a tracing node that received the call signaling message; and
transmitting the trace report to the source address.

20. The logic embodied in computer-readable media of claim 19, wherein the computer program is operable to generate the trace report by generating the trace report that includes context data which describes a plurality of states of the tracing node occurring prior to receipt of the call signaling mode by the tracing node.

21. A device for tracing communications, comprising:
a call control module operable to receive a call signaling message from a first remote element;
a filter module operable to:
determine whether the call signaling message includes a trace tag; and
in response to determining that the call signaling message includes a trace tag, incrementing a trace call counter associated with the trace tag; and
a reporting module operable to transmit a trace report to a second remote element in response to determining that the call signaling message includes a trace tag.

22. The device of claim 21, wherein the filter module is operable to determine whether the call signaling message includes a trace tag by:
adjusting a time-to-live parameter of the trace tag;
determining whether the time-to-live parameter of the trace tag equals a predetermined value; and
removing the tag from the call signaling message if the time-to-live parameters of the trace tag equals the predetermined value.

23. The device of claim 21, wherein the trace tag specifies a report zone and wherein the reporting module is operable to transmit the trace report by:
determining whether a tracing node that received the call signaling message is within the report zone; and
transmitting the trace report to the second remote element if the call signaling message includes a trace tag and the tracing node is within the report zone.

24. The device of claim 21, wherein:
the trace tag includes a report level that specifies one or more types of information to be reported;
the reporting module is operable to transmit the trace report by:
generating the trace report based on the report level if the call signaling message includes a trace tag; and
transmitting the trace report to the second remote element.

25. The device of claim 21, wherein:
the trace tag specifies an address; and
the reporting module is operable to transmit the trace report to the second remote element by transmitting the trace report to the address.

26. The device of claim 21, wherein:
the reporting module is operable to transmit the trace report by transmitting a first trace report to the second remote element if the call signaling message includes a trace tag; and
the reporting module is further operable to:
determine whether the call signaling message includes a second trace report; and
transmit the second trace report to the second remote element if the call signaling message includes the second trace report.

27. The device of claim 21, wherein:
the reporting module is operable to transmit the trace report by attaching a first trace report to the call signaling message if the call signaling message includes a trace tag; and
the reporting module is further operable to:
determine whether the call signaling message includes a second trace report;
if the call signaling message includes the second trace report:
adjust a time-to-live value of the second trace report;
determine whether the time-to-live value of the second trace report is equal to some predetermined value; and
remove the second trace report from the call signaling message if the time-to-live value of the second trace report is equal to the predetermined value; and
transmit the call signaling message to a third remote element downstream along a path associated with the call signaling message.

28. The device of claim 21, wherein:
the trace tag specifies a report protocol; and
the reporting module is operable to transmit the trace report by transmitting the trace report to the second remote element if the call signaling message includes the trace tag and a protocol of the call signaling message matches the report protocol.

29. The device of claim 21, wherein the reporting module is operable to transmit the trace report by:
generating the trace report comprising a source address that identifies a tracing node that received the call signaling message, a report timestamp that identifies a time at which the trace report was generated, a signaling message field that identifies a message type of call signaling message, and context data which describes a state of a tracing node that received the call signaling message; and
transmitting the trace report to the source address.

30. The device of claim 29, wherein the reporting module is operable to generate the trace report by generating the trace report that includes context data which describes a plurality of states of the tracing node occurring prior to receipt of the call signaling mode by the tracing node.

31. A system for tracing communications, comprising:
a management node operable to receive trace reports from remote elements and provide information from the trace reports to a user; and
a tracing node, comprising:
a call control module operable to receive a call signaling message from the management node;
a filter module operable to:
determine whether the call signaling message includes a trace tag; and
in response to determining that the call signaling message includes a trace tag, increment a trace call counter associated with the trace tag; and
a reporting module operable to transmit a trace report to a selected one of the management node and a second tracing node in response to determining that the call signaling message includes a trace tag.

32. The system of claim 31, wherein the filter module is operable to determine whether the call signaling message includes a trace tag by:
adjusting a time-to-live parameter of the trace tag;
determining whether the time-to-live parameter of the trace tag equals a predetermined value and
removing the tag from the call signaling message if the time-to-live parameters of the trace tag equals the predetermined value.

33. The system of claim 31, wherein the trace tag specifies a report zone and wherein the reporting module is operable to transmit the trace report by:
determining whether a tracing node that received the call signaling message is within the report zone; and
transmitting the trace report to second the remote element if the call signaling message includes a trace tag and the tracing node is within the report zone.

34. The system of claim 31, wherein:
the trace tag includes a report level that specifies one or more types of information to be reported; and
the reporting module is operable to transmit the trace report by:
generating the trace report based on the report level if the call signaling message includes a trace tag; and
transmitting the trace report to the second remote element.

35. The system of claim 34, wherein:
the trace tag specifies an address; and
the reporting module is operable to transmit the trace report to the second remote element by transmitting the trace report to the address.

36. The system of claim 34, wherein:
the reporting module is operable to transmit the trace report by transmitting a first trace report to the selected node if the call signaling message includes a trace tag; and
the reporting module is further operable to:
determine whether the call signaling message includes a second trace report; and
transmit the second trace report to the selected node if the call signaling message includes the second trace report.

37. The system of claim 31, wherein:
the reporting module is operable to transmit the trace report by attaching a first trace report to the call signaling message if the call signaling message includes a trace tag; and
the reporting module is further operable to:
determine whether the call signaling message includes a second trace report;
if the call signaling message includes the second trace report:
adjust a time-to-live value of the second trace report;
determine whether the time-to-live value of the second trace report is equal to some predetermined value; and
remove the second trace report from the call signaling message if the time-to-live value of the second trace report is equal to the predetermined value; and
transmit the call signaling message to a third remote element downstream along a path associated with the call signaling message.

38. The system of claim 31, wherein the trace tag specifies a report protocol and wherein the reporting module is operable to transmit the trace report by transmitting the trace report to the second remote element if the call signaling message includes the trace tag and a protocol of the call signaling message matches the report protocol.

39. The system of claim 31, wherein the reporting module is operable to transmit the trace report by:
generating the trace report comprising a source address that identifies a tracing node that received the call signaling message, a report timestamp that identifies a time at which the trace report was generated, a signaling message field that identifies a message type of call signaling message, and context data which describes a state of a tracing node that received the call signaling message; and
transmitting the trace report to the source address.

40. The system of claim 39, wherein the reporting module is operable to generate the trace report by generating the trace report that includes context data which describes a plurality of states of the tracing node occurring prior to receipt of the call signaling mode by the tracing node.

41. A system for tracing communications, comprising:
means for receiving a call signaling message from a first remote element;
means for determining whether the call signaling message includes a trace tag;
means for transmitting a trace report to a second remote element in response to determining that the call signaling message includes a trace tag; and
means for incrementing a trace call counter associated with the trace tag in response to determining that the call signaling message includes a trace tag.

* * * * *